UNITED STATES PATENT OFFICE 2,041,592

PROCESS OF HYDROLYZING CHLOR PHENOLS

Samuel G. Burroughs, Pittsburgh, Pa., assignor to Pennsylvania Coal Products Company, a corporation of Pennsylvania No Drawing. Application October 11, 1934, Serial No. 747,925

16 Claims. (Cl. 260—154)

The present invention is concerned with the hydrolysis of ortho and para chlor phenols or mixtures of the same, to form the corresponding dihydroxy compounds, namely pyrocatechin, and hydroquinone.

That compounds of the aforesaid type can be manufactured by subjecting the corresponding chlor phenols to the action of aqueous alkali metal hydroxide solutions at high temperatures under pressure is well known. Various catalysts, especially copper metal or copper salts have been shown to be beneficial. However, all such processes heretofore proposed for these products have been found to yield very unsatisfactory amounts of the dihydroxy benzenes, and always large amounts of tarry by-products.

A recent United States Patent No. 1,934,656 to Britton, Bass, and Elliott assigned to the Dow Chemical Company (1933) covers a process which overcomes these difficulties in the case of hydroquinone, by taking as a starting material for the hydrolysis, para brom phenol instead of para chlor phenol. It is stated in this patent that, with the brom compound, the hydrolysis proceeds under much easier conditions. The chief objection to this sort of process is the increased cost of the brom compounds over corresponding chlor compounds.

I have now found that ortho chlor phenol or para chlor phenol or mixtures of the two in any proportion may be hydrolyzed to the corresponding dihydroxy compounds, namely pyrocatechin and hydroquinone by subjecting them to the action of aqueous solutions of alkali metal hydroxides of any desired concentration or molar ratio over one at any temperature over 100 deg. C. in a pressure vessel, with or without the use of copper or copper compounds as catalysts. Furthermore, the yields of pyrocatechin and hydroquinone which I have obtained by my process are very satisfactory, and tarry by-products were present in only slight amounts.

This improvement in the trend of these reactions was brought about by adding to the alkali metal hydroxide, oxide or salt solutions which may contain a copper salt as catalyst, amounts of an alkaline earth metal oxide or hydroxide, or salt molecularly equivalent to or in excess of the amounts of the chlor phenol, to be added for hydrolysis, and also equivalent to the amounts of copper salts present.

The function of the alkaline earth metal oxide or hydroxide in this type of reaction is believed to be two fold. In the first place, the copper catalyst is activated so that the reaction runs easier. Secondly, the dihydroxy phenols as formed during the course of the reaction are stabilized by the formation of molecular compounds or salts of the alkaline earth metals. Thus, under a great variety of conditions, with respect to concentration, molar ratio, temperature, pressure, and time, excellent yields of the phenols may be obtained, and by-products are practically negligible.

In carrying out the above processes in a practical manner the following procedure is advisable, although not necessary, for producing pyrocatechin or hydroquinone, or mixtures of the two in satisfactory yields.

The chlor phenol (pure or a mixture of the two isomers) is charged in any suitable pressure vessel equipped with an agitator. The vessel may be constructed either of steel, cast iron, copper, or any alkali resisting metal. An amount of alkali metal hydroxide equal to 2 to 5 moles to 1 mole of chlor phenol, in the form of a water solution of from 5 to 35 per cent concentration is added. Then from 1 to 2 moles of an alkaline earth metal oxide or hydroxide or salt is added as a solid with agitation, with a small amount of copper or a copper salt. The vessel is then closed and heated to a temperature of between 100 deg. and 250 deg. C. for from 2 to 36 hours, depending on the strength and amount of alkali used. At the close of this period, the reaction is complete and the chlor phenol content practically all converted to salts of pyrocatechin or hydroquinone or mixtures of the two, depending on the composition of the original chlor phenol. The contents of the pressure vessel are blown to another tank where it is neutralized with sulphuric acid or sulphur dioxide or other suitable acid as rapidly as removed from the vessel, in order to prevent oxidation. The mass is then filtered and the total filtrates are extracted with a suitable solvent in the known manner. The material extracted is steam distilled to remove unconverted chlor phenols and distilled in vacuo, by which means pyrocatechin and hydroquinone may be separated. Although it is advisable to keep the conditions of the reaction between the limits stated above, it is not absolutely necessary to do so in order to conform to the spirit of my invention, the basic idea of which is the addition of the alkaline earth metal hydroxide, oxide or salt to the other hydrolyzing reagents. Other conditions of reaction with respect to amount and strength of alkali metal hydroxide, temperature, time, pressure, and catalysts may be varied over a wide range. The use of catalysts may be eliminated altogether with small detriment to the efficiency of the process.

The following examples will further illustrate my process:

Example 1

600 parts of pure ortho chlor phenol were charged in an iron pressure vessel with 600 parts of sodium hydroxide and sufficient water to dilute the sodium hydroxide to approximately a 20 per cent solution thereof, 400 parts of dry powdered strontium hydroxide were added with agitation and also 20 parts of finely ground hydrated copper sulphate crystals. The vessel was then closed and heated at 165 deg. to 170 deg. C. for 10 hours. The contents of the vessel were then blown into an equal volume of water and acidified with sulphuric acid. The mass was filtered and extracted with ether, which on evaporation yielded pyrocatechin together with a small amount of unchanged ortho chlor phenol. The mixture was subjected to steam distillation and 20 parts of ortho chlor phenol were recovered. The crude pyrocatechin was then distilled in vacuo yielding a yield of 90 per cent of the theory of pyrocatechin melting at 101 deg. C.

Example 2

A charge, consisting of 600 parts of pure ortho phenol, 800 parts of sodium hydroxide with sufficient water to form a 25 per cent solution, 400 parts of dry powdered strontium hydroxide, and 20 parts of hydrated copper sulphate, was placed in an iron pressure vessel and heated to a temperature of 145 deg. to 150 deg. C. for a period of 10 hours. The contents of the vessel was treated as in Example 1, and yielded 3 per cent of ortho chlor phenol and 75 per cent of theory of pyrocatechin.

Example 3

A charge, as in Example 1, with the exception that no copper salt was used, was placed in a copper vessel and heated at 165 deg. to 175 deg. C. for 10 hours. The reaction mixture on treatment as in Example 1, yielded a 25 per cent recovery of the original ortho chlor phenol, and an amount of pyrocatechin corresponding to 87.5 per cent of the theory.

Example 4

Into a pressure vessel similar to that described in Example 1, were charged 600 parts of pure para chlor phenol, 600 parts of sodium hydroxide and sufficient water to dilute the sodium hydroxide to approximately a 20 per cent solution, 400 parts of strontium hydroxide and 20 parts of copper sulphate. The vessel was closed and heated to a temperature of 175 deg. C. for 10 hours. The contents of the vessel, after cooling, was neutralized with sulphur dioxide, steam distilled to remove unreacted para chlor phenol, and extracted with ether. The ether was distilled off, and the residue was distilled to a still head temperature of 225 deg. C. to remove traces of para chlor phenol. The residue in the flask was crystallized from chlor benzol. By such means it was discovered that 25 per cent of the original para chlor phenol was consumed, of which 75 per cent was converted into hydroquinone.

Example 5

A charge consisting of 600 parts of crude ortho phenol, the composition of which was approximately as follows: ortho chlor phenol—85 per cent, para chlor phenol—5 per cent, and phenol—10 per cent; 600 parts of sodium hydroxide and sufficient water to dilute the sodium hydroxide to approximately a 20 per cent solution thereof, 400 parts of dry powdered strontium hydroxide, and 20 parts of hydrated copper sulphate, was charged into an iron pressure vessel as in Example 1, and heated to a temperature of 175 deg. C. for 10 hours. At the conclusion of the reaction, the reaction mixture was neutralized with sulphuric acid, filtered, and extracted with ether. The ether was distilled off and the crude mixture was steam distilled. 30 parts of chlor phenol were recovered (mainly ortho chlor phenol). The residue was then distilled in vacuo and the phenol pyrocatechin, and hydroquinone constituents were separated by fractionation. There was obtained thus:

| | Parts |
|---|---|
| Phenol, containing 5% pyrocatechin | 65 |
| Pyrocatechin, having a melting point of 101 deg. C | 381 |
| Hydroquinone, having a melting point of 168 deg. C | 18 |

The yields of pyrocatechin and hydroquinone were 85 per cent and 75 per cent of the theory respectively.

Example 6

A mixture of crude chlor phenol, sodium hydroxide, strontium hydroxide, copper sulphate, and water as in Example 5, was passed under pressure greater than the vapor pressure of the reaction mixture through a copper tube, heated throughout to a temperature of 165 deg. C. to 180 deg. C. New parts of the reaction mixture were admitted and discharged from the opposite end of the tube at regular intervals. Each charge was reacted in the tube for a period of approximately 3 hours. The material discharged from the tube after treatment as in Example 5 yielded the following:

| | Parts |
|---|---|
| Phenol | 60 |
| Unconverted chlor phenol | 330 |
| Pyrocatechin | 150 |
| Hydroquinone | 6 |

The sodium hydroxide used in the above examples was the ordinary commercial product, and contained such impurities as chlorides and carbonates. Potassium hydroxide may also be used. Catalysts in the form of copper metal or salts were used, but are not absolutely necessary to produce the desired results. Any copper compound may be substituted which will precipitate copper oxide, or hydroxide with an alkali metal hydroxide.

To summarize, my improved method for hydrolyzing ortho and para chlor phenols or mixtures of the same is characterized by a process of heating these products with aqueous solutions of an alkali metal hydroxide to which has been added an amount of an alkaline earth metal hydroxide, oxide or salt equivalent to or in excess of the chlor phenols present. In the above process, copper or copper compounds may or may not be used. The conditions of the said process, such as temperature and time, may be varied according to the strength and amount of alkali metal hydroxide used. The function of the alkaline earth metal is to stabilize the dihydroxy compounds as soon as formed, for without such procedure, the decomposition of the dihydroxy compounds is practically as rapid as the rate of their formation. Other alkaline earth metals may be substituted for the strontium, such as calcium and magnesium. The pressure under which the process is carried out may be equal to or greater than the normal vapor pressure of the constituents of the reaction under the conditions employed. It is noted that conditions of reaction of my process are well adapted for carrying out continuously in a tubular apparatus.

What I claim is:

1. The process of treating chlor phenols of the group consisting of ortho chlor phenol, para chlor phenol and mixtures of the same to form dihydroxy benzenes, which consists in hydrolyzing the chlor phenol in the presence of a hydrolyzing medium resulting from mixing a hydrolytic catalyst with 2 to 5 molecular equivalents of 5 to 35 per cent aqueous solution of alkali metal compound to which has been added 1 to 2 molecular equivalents of alkaline earth metal compound, said alkali metal and alkaline earth metal compounds lying in the group consisting of the hydroxides, oxides and salts.

2. The process of treating chlor phenols of the group consisting of ortho chlor phenol, para chlor phenol and mixtures of the same to form dihydroxy benzenes, which consists in hydrolyzing the chlor phenol in the presence of a hydrolyzing medium resulting from mixing a copper hydrolytic catalyst with 2 to 5 molecular equivalents of 5 to 35 per cent aqueous solution of alkali metal compound to which has been added 1 to 2 molecular equivalents of alkaline earth metal compound, said alkali metal and alkaline earth metal compounds lying in the group consisting of the hydroxides, oxides and salts.

3. The process of preparing pyrocatechin, which comprises hydrolyzing ortho chlor phenol by heating the same at a temperature between 100 and 300 deg. C. in the presence of a hydrolyzing medium resulting from mixing a copper hydrolytic catalyst with 2 to 5 molecular equivalents of a 5 to 35 per cent aqueous alkali metal compound solution to which has been added 1 to 2 molecular equivalents of alkaline earth metal compound, said alkali metal and alkaline earth metal compounds lying in the group consisting of the hydroxides, oxides and salts.

4. The process of preparing pyrocatechin, which comprises hydrolyzing ortho chlor phenol by heating the same at a temperature between 100 and 300 deg. C. in the presence of a metallic hydrolyzing medium resulting from mixing a copper hydrolytic catalyst with 2 to 5 molecular equivalents of a 5 to 35 per cent aqueous alkali metal compound solution to which has been added 1 to 2 molecular equivalents of alkaline earth metal compound, said alkali metal and alkaline earth metal compounds lying in the group consisting of the hydroxides, oxides and salts.

5. The process of preparing pyrocatechin, which comprises hydrolyzing ortho chlor phenol by heating the same at a temperature between 100 and 300 deg. C. in the presence of a hydrolyzing medium resulting from mixing a copper hydrolytic catalyst with 2 to 5 molecular equivalents of 5 to 35 per cent aqueous sodium hydroxide solution to which has been added 1 to 2 molecular equivalents of strontium hydroxide.

6. The process of preparing pyrocatechin which consists in hydrolyzing ortho chlor phenol by heating the same at a temperature between 100 and 300 deg. C. in the presence of a hydrolyzing medium resulting from mixing a copper catalyst with 2 to 5 molecular equivalents of a 5 to 35 per cent aqueous alkali metal hydroxide solution to which has been added 1 to 2 molecular equivalents of alkaline earth metal hydroxide to obtain a reaction mixture containing pyrocatechin, acidifying, filtering, extracting with a solvent, distilling off the solvent, steaming to remove therefrom unreacted ortho chlor phenol and distilling the pyrocatechin.

7. A continuous process for treating chlor phenols of the group consisting of ortho chlor phenol, para chlor phenol and mixtures of the same, which consists in causing a mixture of the chlor phenol, a catalyst, from 2 to 5 molecular equivalents of a 5 to 35 per cent aqueous alkali metal compound solution and from 1 to 2 molecular equivalents of an alkaline earth metal compound to traverse a zone in which it is heated at a temperature between 100 and 300 deg. C. under a pressure greater than the vapor pressure of the mixture, continuously discharging the reaction mixture, acidifying the same and extracting the dihydroxy compound therefrom, said alkali metal and alkaline earth metal compounds lying in the group consisting of the hydroxides, oxides and salts.

8. The process of preparing hydroquinone which consists in hydrolyzing para chlor phenol by heating the same to a temperature between 100 and 300 deg. C. in the presence of a hydrolyzing medium resulting from mixing a copper catalyst with 2 to 5 molecular equivalents of a 5 to 35 per cent aqueous alkali metal compound solution to which has been added 1 to 2 molecular equivalents of alkaline earth metal compound, said alkali metal and alkaline earth metal compounds lying in the group consisting of the hydroxides, oxides and salts.

9. The process as set forth in claim 8 wherein the catalyst is of metallic copper.

10. The process as set forth in claim 8, in which the alkali metal compound is sodium hydroxide and the alkaline earth metal compound is strontium hydroxide.

11. The process of treating chlor phenols of the group consisting of ortho chlor phenol, para chlor phenol, and a mixture of the same, comprising hydrolyzing one of said group at a temperature varying between 145° and 180° C. by mixing about 600 parts thereof with about 600 to 800 parts of an aqueous alkali metal compound having a concentration varying between 20 to 25%; 400 parts of an alkaline earth metal compound and 20 parts of a copper catalyst, and recovering a dihydroxy benzene from the reaction mixture.

12. The process of treating chlor phenols of the group consisting of ortho chlor phenol, para chlor phenol, and a mixture of the same, comprising hydrolyzing one of said group at a temperature varying between 145° and 180° C. by mixing about 600 parts thereof with about 600 to 800 parts of an aqueous alkali metal compound having a concentration varying between 20 to 25%; 400 parts of an alkaline earth metal compound and 20 parts of a copper sulphate catalyst, and recovering a dihydroxy benzene from the reaction mixture.

13. The process of treating chlor phenols of the group consisting of ortho chlor phenol, para chlor phenol, and a mixture of the same, comprising hydrolyz'ng one of said group at a temperature varying between 145° and 180° C. by mixing about 600 parts thereof with about 600 to 800 parts of an aqueous alkali metal hydroxide compound having a concentration varying between 20 to 25%; 400 parts of an alkaline earth metal compound and 20 parts of a copper sulphate catalyst, and recovering a dihydroxy benzene from the reaction mixture.

14. The process of treating chlor phenols of the group consisting of ortho chlor phenol, para chlor phenol, and a mixture of the same, comprising mixing about 600 parts of one of said group with 600 to 800 parts of an aqueous alkali metal compound having a concentration varying between 20 and 25%; 400 parts of an alkaline metal earth compound, and 20 parts of a copper catalyst and passing said mixture under a pressure greater than the vapor pressure of the reaction mixture through a tube heated to a temperature facilitating the hydrolyzing reaction, and recovering dihydroxy benzene from the reaction mixture.

15. The process of treating chlor phenols of the group consisting of ortho chlor phenol, para chlor phenol, and a mixture of the same, comprising mixing about 600 parts of one of said group with 600 to 800 parts of an aqueous alkali metal compound having a concentration varying between 20 and 25%; 400 parts of an alkaline metal earth compound, and 20 parts of a copper catalyst and passing said mixture under a pressure greater than the vapor pressure of the reaction mixture through a tube heated to a temperature varying between 165° and 180° C., and recovering dihydroxy benzene from the reaction mixture.

16. The process of hydrolyzing chlor phenols of the group consisting of ortho chlor phenol, para chlor phenol and a mixture of the same, comprising mixing one of said group with a hydrolytic catalyst, 2 to 5 molecular equivalents of a 20 to 25% aqueous solution of an alkali metal compound, 1 to 2 molecular equivalents of an alkaline metal earth compound, heating the mixture at a temperature varying between 145° and 180° C., and recovering dihydroxy benzene from the reaction mixture.

SAMUEL G. BURROUGHS.